United States Patent [19]
Tanaka et al.

[11] Patent Number: 6,065,483
[45] Date of Patent: May 23, 2000

[54] THROTTLE BODY AND METHOD OF MANUFACTURING THE SAME

[75] Inventors: Kunio Tanaka, Nagoya; Akihiro Honda, Anjo, both of Japan

[73] Assignee: Denso Corporation, Japan

[21] Appl. No.: 09/104,974

[22] Filed: Jun. 26, 1998

Related U.S. Application Data

[63] Continuation of application No. PCT/JP97/04502, Dec. 8, 1997.

[30] Foreign Application Priority Data

Dec. 9, 1996 [JP] Japan .................................. 8-328290

[51] Int. Cl.[7] ...................................................... F02D 9/08
[52] U.S. Cl. ............................ 137/15; 137/468; 251/366; 251/368; 123/337
[58] Field of Search ..................... 137/468, 15; 251/368, 251/305, 366; 123/337

[56] References Cited

U.S. PATENT DOCUMENTS

| | | | |
|---|---|---|---|
| 4,032,071 | 6/1977 | Imoto | 137/468 |
| 4,284,263 | 8/1981 | Newcomb | 137/468 |
| 5,341,773 | 8/1994 | Schulte . | |
| 5,575,256 | 11/1996 | Peters et al. | 123/337 |

FOREIGN PATENT DOCUMENTS

| | | |
|---|---|---|
| 2-18631 | 2/1990 | Japan . |
| 7-51902 | 6/1995 | Japan . |
| 7-189836 | 7/1995 | Japan . |

*Primary Examiner*—A. Michael Chambers
*Attorney, Agent, or Firm*—Nixon & Vanderhye PC

[57] ABSTRACT

In a resin-made throttle body for controlling air flow rate in an air intake passage, orientation of resinous material of a wall of the throttle body surrounding the valve member has a step portion for controlling orientation of fiber-including resinous material. As a result, the inner periphery of the wall can expand or contract evenly as the valve member expands or contracts.

22 Claims, 4 Drawing Sheets

THROTTLE BODY AND METHOD OF MANUFACTURING THE SAME

CROSS REFERENCE TO RELATED APPLICATION

This is a continuation of PCT application No. PCT/JP97/04502, filed Dec. 8, 1997.

This application is based on and incorporates by reference Japanese Patent Application Hei 8-328290 filed on Dec. 9, 1996 and PCT/JP97/04502 filed on Dec. 8, 1997.

BACKGROUND OF THE INVENTION

1. Field of the Invention

The present invention relates to a resin-made throttle body which provides an air passage and a method of manufacturing the same.

2. Description of Related Art

Recently, a throttle body made of resinous material has been proposed to meet the demand for a reduction in the weight and cost of the throttle valve control unit. However, because the shape of the outer periphery of the throttle body enclosing the throttle valve is simply cylindrical, except for a throttle shaft holder, the molecular orientation of the resinous material may be formed in the direction that the resinous material is fed to a molding die. If glass fiber or carbon fiber is mixed to the resinous material to reinforce the throttle body, the fiber will also be oriented in the feeding direction.

If the resinous material is oriented in the throttle body, thermal expansion and contraction of the throttle body varies with direction. The orientation difference makes it difficult to provide a suitable clearance around the throttle valve. For example, if the throttle body has a round throttle valve therein, it is necessary to have a cylindrical inner periphery. However, a resin-made throttle body having an orientation difference as described above may deform, making it difficult to accurately control the air-flow rate, particularly, a small air-flow rate. Because the throttle valve also expands or contracts, the throttle body is required to expand or contract to the same degree to maintain the clearance. Thus, this orientation difference is an obstacle to the accurate control of the flow rate.

If the inner periphery of the throttle body expands or contracts differently in different directions, a portion of the throttle body may come into contact with the throttle valve, thereby hampering smooth rotation of the throttle valve.

JP-B2-7-51902 discloses a throttle body in which a metal ring is insert-molded into the inner periphery of the throttle body around the throttle valve. This eliminates the problems caused by the orientation difference of the throttle body, thereby providing an accurate clearance between the outer periphery of the throttle valve and the inner periphery of the throttle body.

However, inserting a metal ring into the throttle body hinders the reduction of the weight and cost of the throttle body.

SUMMARY OF THE INVENTION

A main object of the present invention is to provide a light and inexpensive throttle body free from problems caused by the orientation difference of the resinous material.

Another object of the present invention is to provide a method of manufacturing the above light and inexpensive throttle body.

In a throttle body according to a main aspect of the invention, resinous material forming a wall of the throttle body is oriented to deform in correspondence to the deformation of the throttle valve member so that the clearance between the valve member and the inner periphery of the wall can be maintained even if the throttle body expands or contracts. Thus, the air flow rate can be controlled accurately. In case the throttle-open-angle is very small and only a small quantity of the air is controlled, the compensation ratio related to the temperature change can be minimized and fluctuation of the engine operation due to temperature change can be controlled effectively. It is important that the resinous material of the walls be oriented to deform in correspondence to the deformation of the throttle valve.

In the throttle body according to another aspect of the invention, an orientation control portion is formed at the wall of the throttle body so that the orientation of the resinous material can be made random or uniform. As a result, the wall of the throttle body can provide a suitable thermal expansion or contraction characteristic. That is, the wall surrounding the valve member can expand or contract uniformly.

In a method of manufacturing a throttle valve according to the invention, at least a portion of the flow of the resinous material fed in the axial direction is guided to the circumference of the wall surrounding the valve member. Accordingly, the resinous material of the wall can be oriented in the circumferential direction. Since the inner periphery of the wall of the throttle body expands or contracts uniformly, the clearance between the valve member and the inner periphery of the throttle body can be kept even, thereby controlling the air flow rate accurately.

BRIEF DESCRIPTION OF THE DRAWINGS

Additional objects and advantages of the present invention will be more readily apparent from the following detailed description of preferred embodiments thereof when taken together with reference together with the accompanying drawings in which.

DETAILED DESCRIPTION OF PREFERRED EMBODIMENTS

Figure 1:
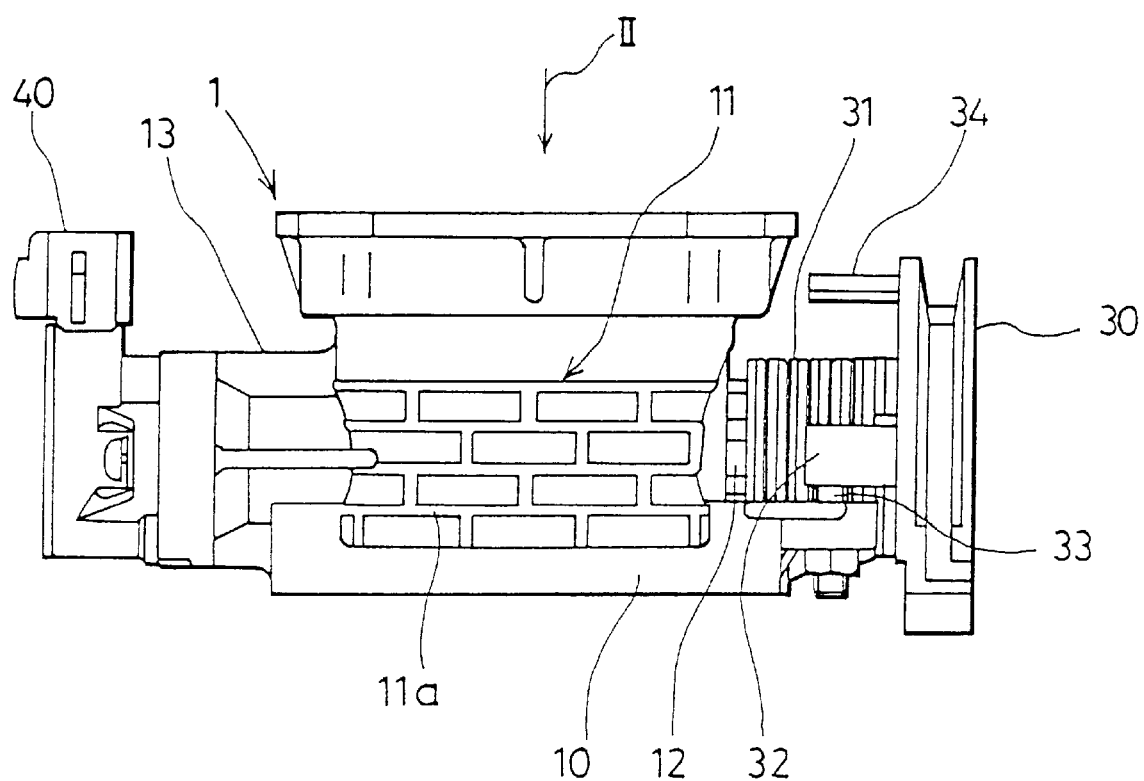
FIG. 1 is a front view illustrating a throttle valve control unit according to a first embodiment of the present invention.

Embodiments of the present invention are described below with reference to the appended drawings.

(First Embodiment)

A throttle valve control unit using a throttle body according to a first embodiment of the present invention is described with reference to FIGS. 1, 2 and 3.

Throttle valve control unit 1 is composed of throttle body 10 connected to a suction pipe (not shown) at openings formed on opposite ends thereof and controls air flow rate in the air intake passage formed by the suction pipe and throttle body 10. Throttle body 10 is made of resinous material and has a wall surrounding throttle valve 20 (described below). The wall has step portion 11 having a plurality of rectangular patterns formed regularly. Step portion 11 has a plurality of banks 11a rising from the outer wall of throttle body 10. The wall of throttle body 10 having step portion 11 surrounding throttle valve 20 is disposed between support members 12 and 13 for throttle shaft 21 (described below).

Figure 2:
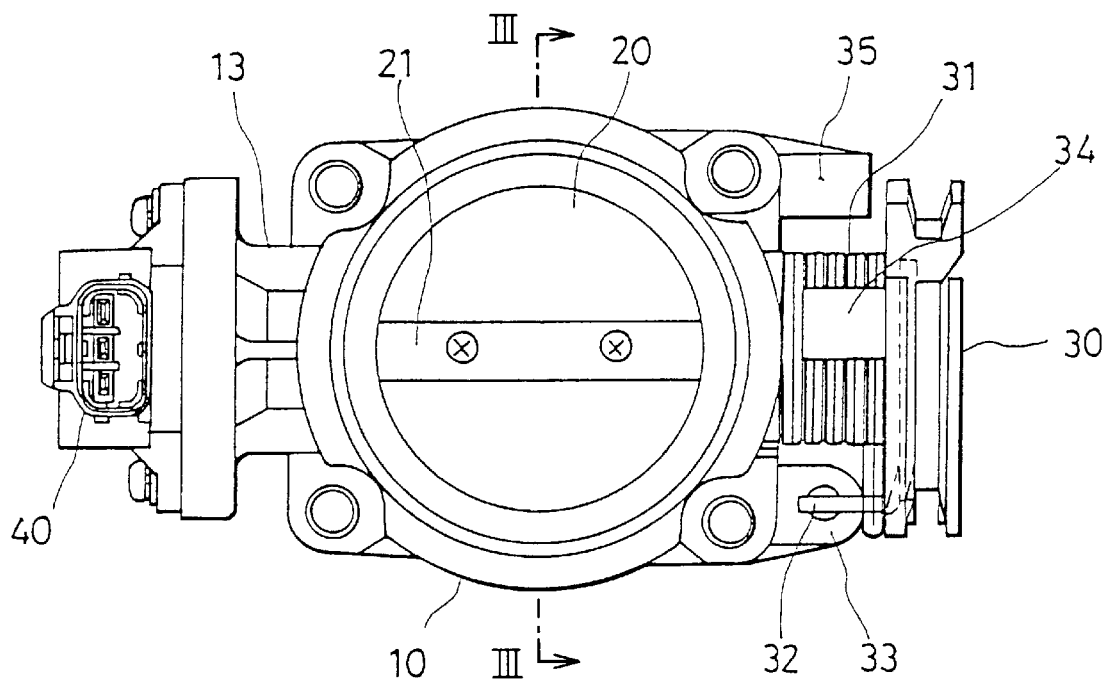
FIG. 2 is a view viewed from portion II in FIG. 1.
Figure 3:
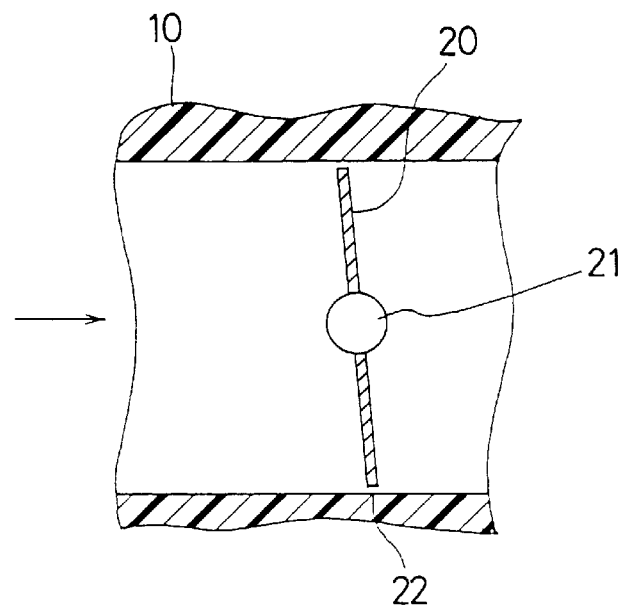
FIG. 3 is a fragmentary cross-sectional view cut along line III—III in FIG. 2.

Butterfly-type throttle valve 20 shown in FIG. 2 is made of aluminum or brass and is fastened to throttle shaft 21 by screws. Opposite ends of throttle shaft 21 are supported by bearings (not shown) disposed in support members 12, 13. The fully closed position of throttle valve 10 provides a small clearance between the same and the inner periphery of throttle body as shown in FIG. 3 in order to provide air for the engine idling operation as well as smooth rotation of throttle valve 20 without interference between throttle valve 20 and throttle body 10.

Acceleration lever 30 is disposed at an end of support member 12, as shown in FIG. 1, is linked with an acceleration pedal (not shown) to be rotated according to the operation of the pedal. When acceleration lever 30 rotates, throttle shaft 21 and throttle valve 20 rotate together therewith. Spring 31 biases acceleration lever 30 toward the full close position. Full-close lever 32 is fixed to acceleration lever 30 to settle throttle valve 20 at the full close position when it engages with full close stopper 33.

A throttle-open-angle sensor (not shown) is disposed on the end portion of support member 13 and provides open-angle signals at connector 40.

The resinous material forming throttle body 10 includes glass fibers or carbon fibers to reinforce throttle body 10. When throttle body is molded, the resinous material including the glass fibers or carbon fibers is fed in the axial direction along the air passage. The mold die has concavities at portions corresponding to banks 11a. When the resinous material passes through the concavities, the flow thereof becomes turbulent and the orientation of the fibers becomes random. The fibers become disheveled in step portion 11 through the thickness thereof evenly over the circumference of throttle body 10. In other words, the random flow of the fibers in the thickness of throttle body 10 is formed uniformly in the circumferential and the axial directions of throttle body 10. The random orientation of fibers is also formed in the resinous material fed to support members 12, 13. The random orientation of the fibers in step portion 11 is the same in degree as in support members 12, 13, so that the coefficient of thermal expansion can become uniform all over throttle body 10. Even if throttle body 10 expands or contracts due to temperature change, the wall of throttle body 10 having step portion 11 that surrounds throttle valve 20 expands or contracts uniformly. In other words, because the wall of throttle body deforms in correspondence with the thermal deformation of throttle valve 20, the clearance between the outer periphery of throttle valve 20 and the inner periphery of throttle body 10 can be kept even. Even if throttle valve 20 and throttle body 10 expand or contract due to temperature change, the air flow rate of the air intake passage can be controlled accurately. Thus, a portion of throttle body 10 is prevented from getting in the way of throttle valve 20, thereby ensuring smooth rotation of the throttle valve.

The thermal expansion coefficient of throttle body 10 can be made as same as that of throttle valve 20 by controlling the fibers in quantity and, therefore, the clearance between the outer periphery of throttle valve 20 and the inner periphery of throttle body 10 can be kept unchanged without regard to the thermal expansion or contraction of throttle valve 20 and throttle valve 10. Thus, the air flow rate can be controlled accurately without regard to temperature change.

(Second Embodiment)

Figure 4:
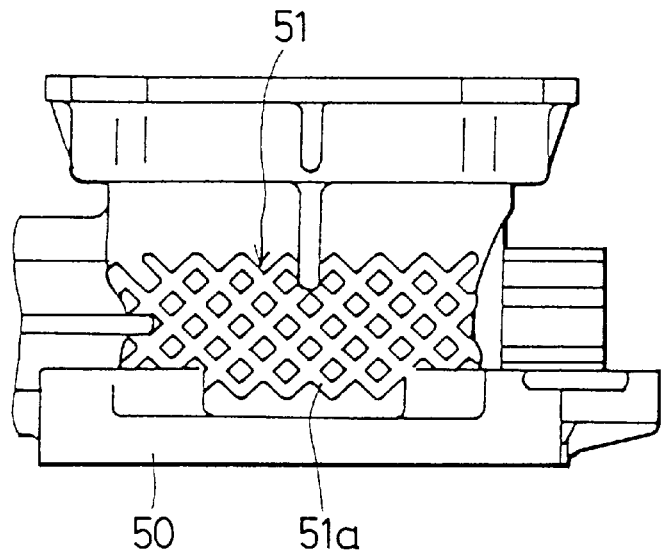
FIG. 4 is a front view illustrating a throttle valve control unit according to a second embodiment of the present invention.

A second embodiment of the present invention is described with reference to FIG. 4.

Banks 51a of step portion 51 are formed on throttle body 50 to be inclined with respect to the axial direction. When the fibers included in the resinous material are fed into a mold die, the flow of the resinous material becomes turbulent, and the fibers become disheveled. Accordingly, even if throttle body 50 expands or contracts due to temperature change, the wall of throttle body 50 expands or contracts evenly at the step portion surrounding the throttle valve so that the clearance between the outer periphery of the throttle valve and the inner periphery of throttle body 50 can be kept even. As a result, even if the throttle valve and throttle body 50 expand or contract due to temperature change, the air flow rate of the air passage can be controlled accurately.

(Third Embodiment)

Figure 5:
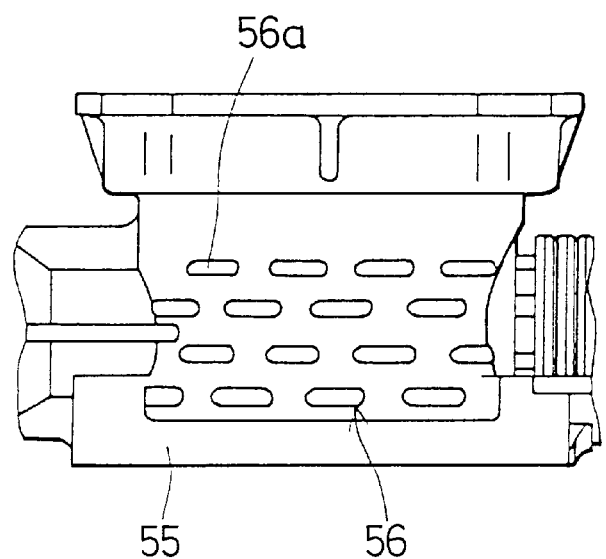
FIG. 5 is a front view illustrating a throttle valve control unit according to a third embodiment of the present invention.

A third embodiment is described with reference to FIG. 5.

A plurality of hollows 56a, which form step portion 56, are formed on the outer periphery of throttle body 55. When the resinous material including fiber is fed to a mold die, the flow of resinous material becomes turbulent and the fiber included in the resinous material becomes disheveled. Accordingly, even if throttle body 55 expands or contracts due to temperature change, the wall of throttle body expands equally in each direction at step portion 51 surrounding the throttle valve, so that the clearance between the outer periphery of the throttle valve and the inner periphery of throttle body 55 can be kept even.

(Fourth Embodiment)

Figure 6:
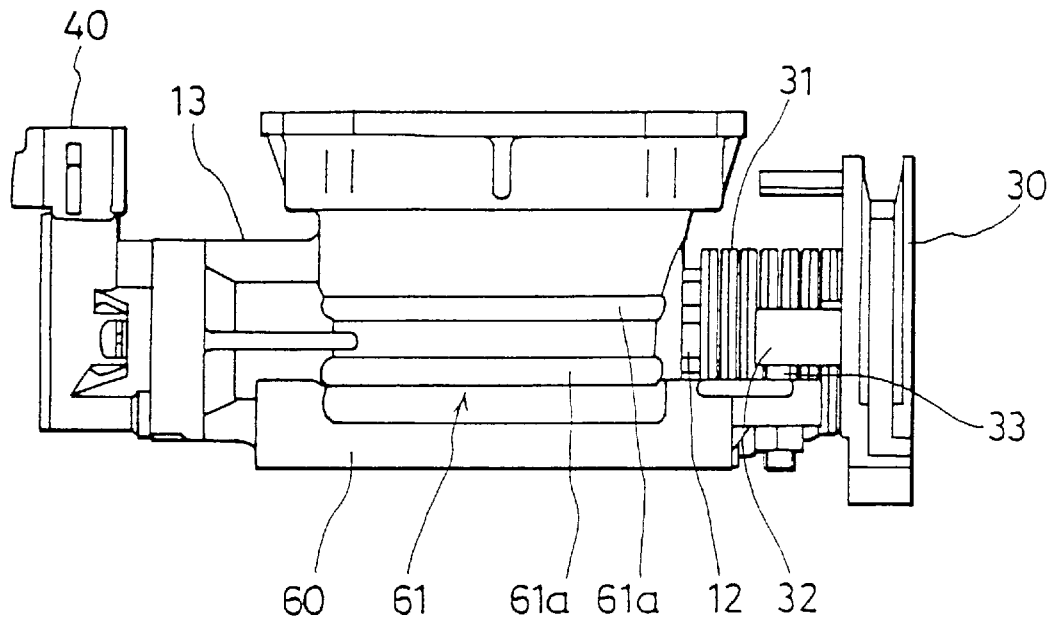
FIG. 6 is a front view illustrating a throttle valve control unit according to a fourth embodiment of the present invention.

A fourth embodiment of the present invention is described with reference to FIGS. 6 and 7.

Double ring-shaped banks 61a are formed as step portion 61 on the outer periphery of throttle body 60 surrounding throttle valve 20.

Figure 7:
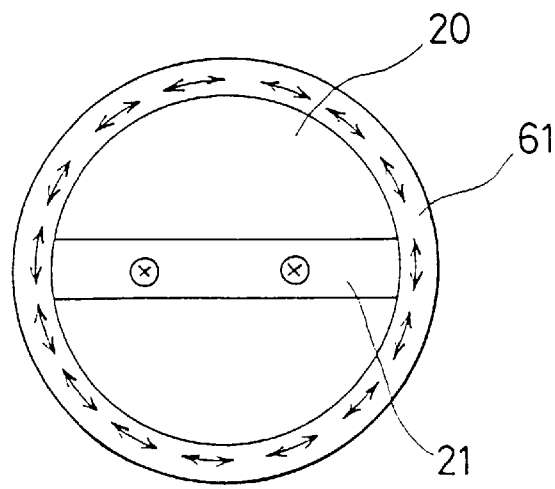
FIG. 7 is a schematic diagram illustrating the orientation of a portion of a throttle body surrounding a throttle valve according to the fourth embodiment of the present invention.

When throttle body 60 is molded, the resinous material including glass or carbon fibers is fed to a mold die in the axial direction along the air intake passage, a portion of the axial flow of resinous material is guided by banks 61a in the circumferential direction of throttle body 60 so that the fibers of the portion of throttle body 60 surrounding throttle valve 20 are oriented in the circumferential direction as indicated by arrows in FIG. 7. Accordingly, even if throttle body 60 expands or contracts due to temperature change, the wall having step portion 61 of throttle body 60 expands or contracts equally, so that variations of the clearance between the outer periphery of throttle valve 20 and the inner periphery of throttle body can be reduced.

As described above, fiber material is included to reinforce the valve body in the resinous material of the same. However, molecular orientation may be formed to make the coefficient of the thermal expansion of the valve body uneven when throttle body is molded from resinous material including no fiber. One of the above-described step portions disposed on the throttle body is also effective to prevent the above problem.

Instead of the step portion described above, a member, which can disturb the flow of the resinous material during feeding, can be inserted in the wall.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A method of manufacturing a resin throttle body having an air passage and a valve member therein for controlling air flow rate in said passage, comprising the steps of:

feeding fiber-reinforced resinous material in a throttle-body-molding die in an axial direction thereof, said throttle-body-molding die having a plurality of concavities formed on a circumference of a wall thereof surrounding said valve member; and guiding a portion of said resinous material to said circumference of said wall surrounding said valve member, whereby a resin throttle body is formed having a plurality of banks corresponding to said concavities, rising from the outer wall of the throttle body, in which resinous material is randomly oriented.

2. A resin made throttle body having an air passage and a valve member therein for controlling air flow rate in said air passage, said throttle body comprising:

a wall member surrounding said air passage and valve member, said wall member having a step portion including a plurality of banks rising from the outer surface of the wall member, in which resinous material is randomly oriented in circumferential and axial directions of said throttle body.

3. The throttle body as claimed in claim 2 further comprising a pair of support members for supporting said valve member, wherein said wall is disposed between said pair of support members.

4. The throttle body as claimed in claim 3, wherein the orientation of resinous material of said support members is the same as the orientation of said resinous material of said wall.

5. The throttle valve as claimed in claim 2, wherein the orientation of said resinous material of each portion of the circumference of said wall is uniform.

6. The throttle body as claimed in claims 2, wherein said resinous material includes fiber whose orientation is controlled.

7. The throttle body as claimed in claim 2, wherein said step portion controls said orientation of said resinous material of said wall randomly.

8. The throttle body as claimed in claim 2, wherein said step portion guides the flow of said resinous material of said wall in the circumferential direction.

9. The throttle body as claimed in claim 2, wherein said step portion has a plurality of rectangular patterns defined thereon surrounded by said plurality of banks.

10. The throttle body as claimed in claim 2, wherein said plurality of banks are inclined with respect to the axial direction of the throttle body.

11. The throttle body as claimed in claim 2, wherein said step portion has a plurality of regular geometric patterns defined thereon surrounded by said plurality of banks.

12. The throttle body as claimed in claim 11, wherein said plurality of banks are inclined with respect to the axial direction of said throttle body.

13. The throttle body as claimed in claim 2, wherein said plurality of banks comprise a plurality of ring-shaped banks encircling said throttle valve.

14. A resin made throttle body having an air passage and a valve member therein for controlling air flow rate in said air passage, said throttle body comprising:

a wall member surrounding said air passage and said valve member, said wall member having an outer peripheral surface, a step portion being defined in said outer peripheral portion, said step portion including a plurality of banks, said banks projecting radially outwardly with respect to an axis of said air passage, whereby resinous material is randomly oriented in said wall member adjacent said banks.

15. The throttle body as claimed in claim 14, wherein said wall member is formed from a resinous material having reinforcing fibers therein.

16. The throttle body as claimed in claim 15, wherein said reinforcing fibers of said resinous material are randomly oriented in circumferential and axial directions of said throttle body.

17. The throttle body as claimed in claim 15, wherein said fibers are randomly oriented in said resinous material whereby the wall of said throttle body expands or contracts evenly at said step portion.

18. The throttle body as claimed in claim 14, wherein said step portion has a plurality of rectangular patterns defined thereon surrounded by said plurality of banks.

19. The throttle body as claimed in claim 14, wherein said plurality of banks are inclined with respect to the axial direction of the throttle body.

20. The throttle body as claimed in claim 14, wherein said step portion has a plurality of regular geometric patterns defined thereon surrounded by said plurality of banks.

21. The throttle body as claimed in claim 14, wherein said plurality of banks are inclined with respect to the axial direction of said throttle body.

22. The throttle body as claimed in claim 14, wherein said plurality of banks comprise a plurality of ring-shaped banks encircling said throttle valve.

* * * * *